United States Patent [19]

Carr, Jr.

[11] 3,845,478

[45] Oct. 29, 1974

[54] MAGNETIC DOMAIN COMPUTATIONAL ARRANGEMENT

[75] Inventor: Walter J. Carr, Jr., Pittsburgh, Pa.

[73] Assignee: Westinghouse Electric Corporation, Pittsburgh, Pa.

[22] Filed: Dec. 6, 1973

[21] Appl. No.: 422,477

[52] U.S. Cl. .................. 340/174 TF, 340/174 EB, 340/174 HA, 324/142

[51] Int. Cl. ...................................... G11c 11/14

[58] Field of Search ............ 340/174 TF; 324/76 R, 324/76 A, 144, 142

[56] References Cited

OTHER PUBLICATIONS

Journal of Applied Physics–Bubbles and Doughnuts Vol. Doughnuts, No. 4, Mar. 15, 1971; pg. 1266–1267.

*Primary Examiner*—James W. Moffitt
*Attorney, Agent, or Firm*—R. W. Smith

[57] ABSTRACT

Single wall magnetic domains are propagated in response to two drive control magnetic fields each controlled by two input signals. Domain velocities are established by the combined effects of the control magnetic fields which control the domain size and the magnitude of a magnetic field gradient developed across each domain. A computed time integral of the product of the two input signals is then responsive to the distances that magnetic domains are propagated.

4 Claims, 5 Drawing Figures

PATENTED OCT 29 1974 3,845,478

SHEET 1 OF 2

MAGNETIC DOMAIN COMPUTATIONAL ARRANGEMENT

BACKGROUND OF THE INVENTION

This invention relates to a magnetic domain computational arrangement and more particularly to such an arrangement in which magnetic domains are propagated at velocities proportional to the product of the magnitudes of two drive control fields responsive to two input signals.

Single wall magnetic domains are generated and propagated in a magnetic layer of domain propagating material and have their movement controlled in various known propagating arrangements to perform many desired functions primarily in the field of logic circuits and high density data storage such as utilized in digital computing apparatus. Further uses of domain propagating arrangements are known as, suggested in the copending application Ser. No. 368,914, filed June 11, 1973 and now abandoned, by Walter J. Carr, et al, which is a continuation application of the application Ser. No. 250,706 filed May 5, 1972, and now abandoned both assigned to the assignee of this invention, for performing analog measuring and computational operations including addition, subtraction and multiplication of two or more quantities represented by input signals applied to a domain propagating device. In one of the devices disclosed in the aforementioned copending application, integrating measurements are provided by propagating a magnetic domain at a velocity responsive to the product of two input signals across predetermined distances. Upon detecting the distance that the domain travels the device initiates electronic pulses in which the number of pulses are indicative of the time integral of the product of two quantities. Such integrating functions are required for measuring a watthour electrical energy consumption quantity in which current and voltage components of the electrical power define two quantities that are to be multiplied and the resultant product is integrated over a predetermined time interval. In the prior disclosed device, magnetic domains are propagated in response to a self induced drive field controlled by the input signals to generate pulses in a domain detector after the domain moves a predetermined distance at a velocity established by the drive fields so as to be responsive to the time integral of the product of the voltage and current components, i.e., watthours.

SUMMARY OF THE INVENTION

In accordance with the present invention, a magnetic domain computational circuit arrangement includes a domain propagation device including a magnetic layer made of a domain propagating material with a domain propagating channel defined in the layer. A domain area drive control field source and a controlled gradient drive control field source cooperatively drive a single wall magnetic domain at a velocity responsive to the produce of the two fields. First and second input signals, representative of two quantities to be computed, control the domain propagating drive control fields such that the domain velocity is proportional to the product of the two input signals. The domains travel a predetermined distance from a domain generator to a domain detector along a channel whereupon the detector initiates a pulse. The pulses are counted so that the number of the pulses is equal to a time integral, over a predetermined time period, of the product of the two input signals.

It is an important feature of this invention to provide a magnetic domain computational arrangement in which magnetic domains are driven in combined response to a first control field source, which controls the diameter of cylindrical single wall magnetic domains, and also a second control field source, which establishes a magnetic gradient across the domains, so that the domains are propagated at a velocity proportional to a combined function of the magnetic gradient developed across the domain and the domain size. It is a further important feature of this invention to provide the time integral of the product of two quantities which control a domain area control magnetic field and a controlled gradient control magnetic field such that the product of the magnitudes of these two field drive a magnetic domain a predetermined distance between a domain generator and a domain detector. And a still further important feature of this invention is to provide a magnetic domain computational arrangement in which a first input signal which is responsive to a current component quantity of an alternating current power quantity to be measured and a second input signal which is responsive to a voltage component quantity of the power quantity are effective to control magnetic fields which in combination drive repeatedly generated magnetic domains at velocities proportional to the product of the input signals and in which the distance that the magnetic domains travel are detected to produce pulses having a total count which is an indication of an electrical energy quantity in watthours.

Other advantages and features of this invention will be apparent from the description of the drawings briefly described hereinafter.

DESCRIPTION OF THE PREFERRED EMBODIMENT

Figures 1, 1A:
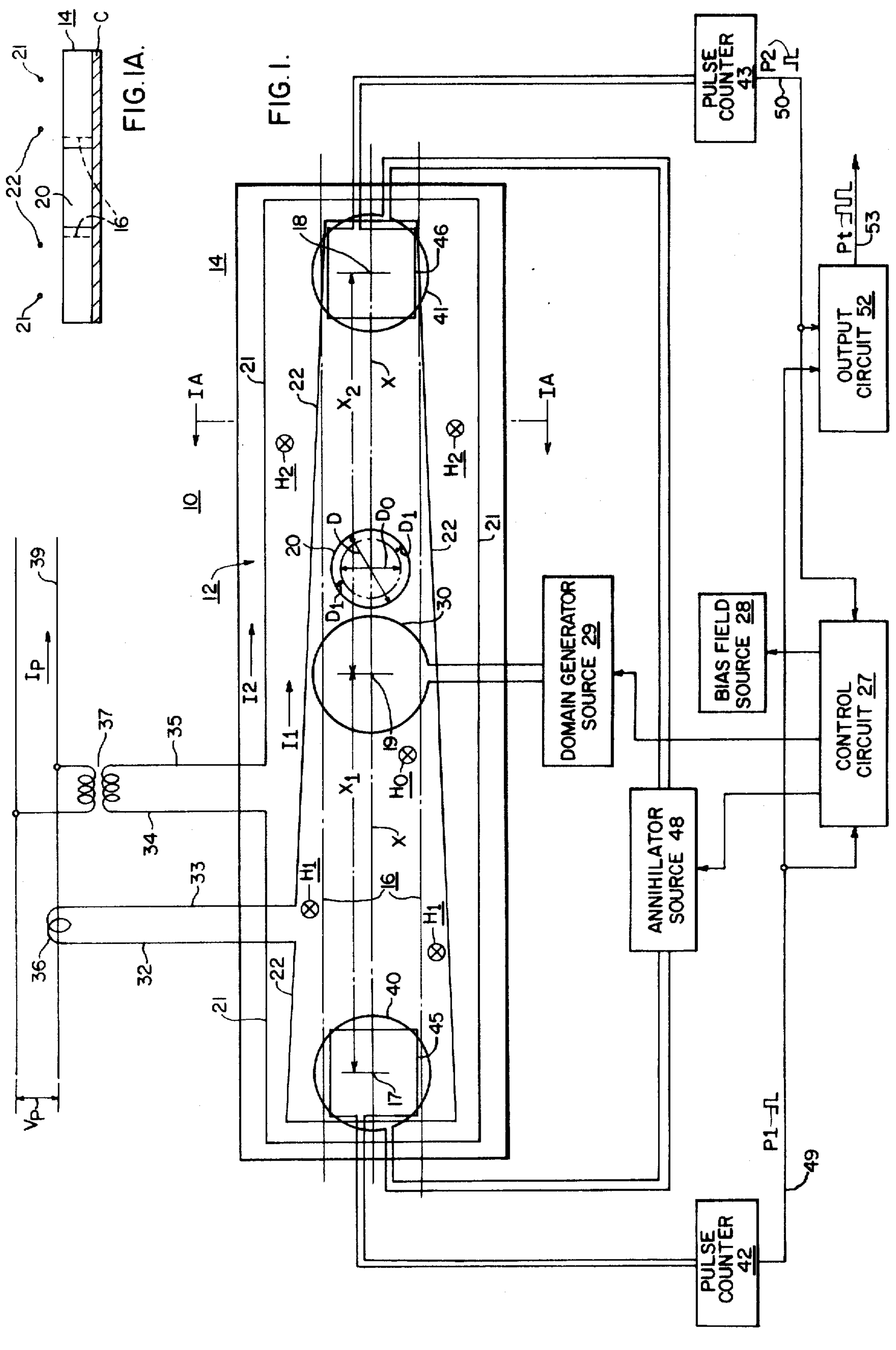
FIG. 1 illustrates a magnetic domain computational arrangement made in accordance with this invention.
FIG. 1A is a cross sectional view taken along the axis IA—IA and looking in the direction of the arrows of a magnetic domain propagating device shown in FIG. 1.

Referring now to FIG. 1 of the drawings a magnetic domain computational arrangement 10 is shown made in accordance with the present invention including a magnetic domain propagating device 12. A magnetic layer 14 formed of a material of the magnetic domain propagating type is provided in the device 12. A domain propagating channel 16 is defined in the magnetic layer 14 having a straight elongated configuration provided in accordance with the operation of the device 12 as described further hereinbelow. A center axis X of the channel 16 is shown extending in the plane of the layer 14. Opposite end portions of the channel 16 are designated by numerals 17 and 18 and a center portion designated by numeral 19, of the channel is located substantially equidistant from the ends 17 and 18.

Magnetic field producing parts of the devive 12 include a bias magnetic field $H_o$ understood by those skilled in the art to produce field directed into the layer 14 perpendicular to the plane of the drawing having an appropriate polarity and magnitude to establish and stabilize a single wall magnetic domain 20 in the channel 16. The domain 20 has a cylindrical configuration understood to have a magnetization polarity opposite to that of the magnetization of the remaining portion of the layer 14. Drive determining and control magnetic field sources of the device 12 includes a conductor loop 21 having a rectangular configuration with the elongated sides thereof extending between the channel end portions 17 and 18 and substantially equally spaced from the center axis X of the channel 16 so as to direct a controllable uniform magnetic field $H_2$, in space and in time into the channel 16 perpendicular to the plane of the drawing throughout the length thereof. The field $H_2$ is a first and domain diameter drive control field effective to add and substract from the magnitude of the field $H_o$ to vary the area of the domain 20 by varying the diameter D of the circular cross section thereof that is parallel to the plane of the layer 14.

A second or controlled gradient control field $H_1$ is produced by a field source formed by conductor loop 22 extending between the channel end portions 17 and 18 along tapered or converging sides with respect to the center axis X of the channel 16. This configuration provides a gradient along the length of the magnetic field $H_1$ which is strongest at one end, for example the end 18, and uniformly decreases in field strength toward the other end 17. Field $H_1$ is then variable in time. The magnetic fields $H_1$ and $H_2$ cooperatively drive the domain 20 such that one component of the velocity is proportional to the product of the fields $H_1$ and $H_2$ as described more fully hereinbelow.

In the cross sectional view of FIG. 1A a damping plate C is shown extending along the bottom of the layer 14. The damping plate C is made of a conductive material and damps the velocity of propagation of the domain 20 as noted further herein below.

Control of the computational circuit arrangement 10 to initiate and synchronize magnetic domain propagations for the computational operations is provided by a control circuit 27. A bias field source 28 which produces the field $H_o$, at a substantially constant and uniform strength, is controlled by the circuit 27. A domain generator source 29 is also controlled by the control circuit 27 and is connected to a domain generator 30 located at the center portion 19 of the channel 16. A magnetic domain 20 is initiated by the generator 30 in response to a pulse developed by the source 29.

A first computational input is formed by conductors 32 and 33 connected to the conductor loop 22 to apply thereto a first input signal I1 related to one quantity to be computed upon. A second computational input is formed by conductors 34 and 35 connected to the conductor loop 27 to apply thereto a second input signal I2 related to another quantity to be computed upon. The signals I1 and I2 provide current magnitudes in the loops which establish corresponding magnitudes in the intensities of the magnetic fields $H_1$ and $H_2$. The input signals I1 and I2 are proportional to quantities that are desired to have the time integral of the product thereof computed by the circuit arrangement 10. In the preferred embodiment the input signal I1 is responsive to a current quantity Ip and the input signal I2 is responsive to a voltage quantity Vp each developed at a current transformer 36 and potential transformer 37, respectively. The current Ip and voltage Vp represent the current and voltage components of an electrical power being of a conventional alternating current type supplied through conductors 38 and 39. The transformers 36 and 37 are appropriately connected to conductors 38 and 39 in the circuit arrangement 10 in accordance with the equation $$WHr = \int_{to}^{tn} IpVpdt$$

where time *to* to time *tn* is a predetermined time interval.

Referring now further to the domain propagating device 12 and the associated electrical circuit elements, magnetic domain detectors 40 and 41 are located at the channel end portions 17 and 18, respectively, and are provided by a known type of magnetic domain detector utilizing magnetic-resistive, Hall-effect and like devices having domain magnetization responsive characteristics which are understood by those skilled in the art. Accordingly, the detectors 40 and 41 are located at equal distances X1 and X2, respectively, along the axis X from the domain generator 30. Upon the domain 20 being propagated the lengths X1 or X2 in accordance with the drive control fields $H_1$ and $H_2$, a pulse is generated by either a first pulse counter 42 connected to the output of the detector 40 or a second pulse counter 43 connected to the output of the detector 41.

A magnetic domain annihilator 45 is associated with the detector 40 and a domain annihilator 46 is associated with the detector 41 such that after the domain 20 is detected by one of the detectors 40 or 41 it is eliminated by the annhilators under control of an annihilator source 48 controlled by the control circuit 27. The control circuit is effective to generate a new magnetic domain upon a previously generated domain being detected and annihilated at either of the end portions 17 or 18 or the propagating channel 16. To provide this, output pulses P1 and P2 from the pulse counters 42 and 43, as shown, or alternatively from the detectors 40 and 41 are connected to the control circuit 27. The outputs 49 and 50 of the pulse counters 42 and 43 are applied to an output circuit 52. The output 53 of the circuit 52 provides a signal Pt representing the difference between the pulses P1 and P2 counted by the counters 42 and 43 and therefore signal Pt is the computed output signal of the arrangement 10.

The relationships of the magnetic field producing parts to effect the required domain propagation in accordance with this invention is described hereinafter. A domain 20 has a reference diameter $D_o$ when maintained by the bias magnetic field $H_o$ alone without fields $H_1$ and $H_2$. The actual diameter D is established by increasing or decreasing the diameter $D_o$ by an amount $D_1$ due to the magnitude of the field $H_2$ as determined by the level of the input signal I2. The approximate maximum magnitude of the first drive control field $H_2$ is in the order of 10 percent of the magnitude of the fixed bias field $H_o$ and is varied within a range of 10 percent of the fixed bias field to adjust the area or the actual diameter D of the domain 20. The domain diameter D is then equal to $D_o$ plus $D_1$ over a limited range of D1 which is variable in proportion to variations of the input current I2.

The controlled gradient drive control field $H_1$ produces a magnetic gradient across the domain 20 along the elongated axis X of the propagating channel 16 that is equal to the differential change in the field $H_1$ ($dH_1$) across the differential distance along the axis X ($dx$). This gradient is expressed as the derivative $dH_1/dx$. The magnitude of $H_1$ is small compared to the magnitude of the magnetic field $H_2$, for example in the order of ½ to 1½ percent of the magnetic field $H_2$. The relative magnetic field strength of the field $H_1$ is sufficiently small so that the domain diameter D is substantially unaffected by variations in the input signal I1. The resultant magnetic force on the magnetic domain 20 due to the magnetic gradient is directly proportional to the product of the domain diameter in the plane of the layer 14 as represented by the diameter D and the magnetic gradient established thereacross. Domain movement due to a magnetic gradient is described in more detail in the above identified application Serial No. 368,914.

The force on the domain 20 along the axis X is equal to $F_x$ which is proportional to the velocity $V_x$ along the X axis. In accordance with above description the relationships are expressed by the equation $F_x \approx V_x = KD\,(dH_1/dx)$ or $K(D_0+D_1)\,(dH_1/dx)$, where K is a constant quantity. The domain velocity $V_x$ at any instant is equal to the derivative $dx/dt$ so the distance that the domain travels in time $t$ is expressed by the equation $$X = K\int_0^t (D_0 + D_1)(dH_1/dx)dt.$$

For alternating current input signals, the reference diameter $D_0$ part of the domain diameter D is acted upon by an alternating gradient field therefore, the driving force including the $D_0$ term can be neglected in a period of time $t$ long compared with the period of a cycle. Since the $D_1$ term is determined by the input signal I2 and the derivative term $dH_1/dx$ is determined by the input signals I1, where the input signals I1 and I2 are alternating the equation becomes $$X = A\int_0^t I1\ I2\ dt,$$

which is also equal to $$X = C\int_0^t Pdt$$

where P is the power, and A and C are constants.

It is to be noted that during a complete cycle of each of the input signals I1 and I2 the magnetic domain 20 is driven in opposite directions but with a net displacement along the axis X as described further hereinbelow. Also, the device 12 is arranged so that the magnetic domain 20 is propagated with a net displacement each cycle which is a small fractional distance of the lengths X1 or X2.

Figure 2A:
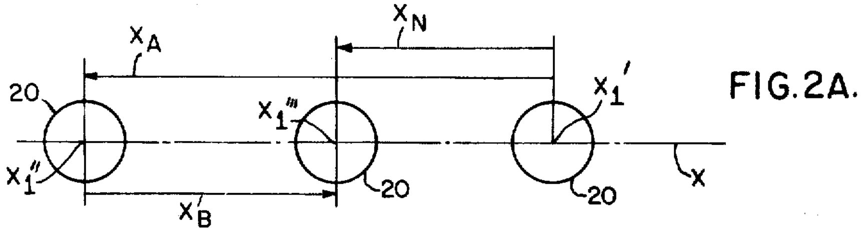
FIGS. 2A, 2B and 2C illustrate schematic views of different operative conditions of a magnetic domain being propagated in the arrangement shown in FIG. 1.
Figure 2B:
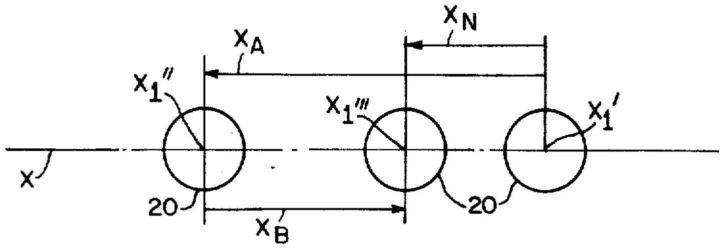
Figure 2C:
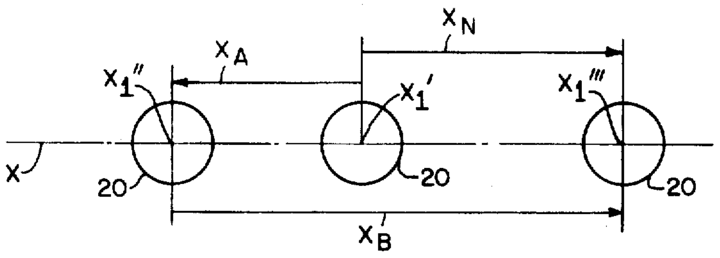

Referring to the FIGS. 2A, 2B, and 2C to further explain the net displacement of the magnetic domain 20 due to the alternating gradient field $dH_1/dx$, three different phase relationships are shown and although different domain diameter states are noted, they are shown as the same size throughout these figures to simplify the drawing. In FIG. 2A the propagating effect is shown for the case when the input signals I1 and I2 are in phase corresponding to unity power factor for the measured power P.

It is assumed that when both of the input signals have a positive half cycle the variable diameter component $D_1$ increases the domain diameter D and the gradient drive control field $H_1$ drives the magnetic domain 20 to the left along the X length of the channel 16. This moves the magnetic domain from position $X_1'$ to position $X_1''$ through a distance to the left indicated by the arrow $X_A$. During the negative half cycle the component $D_1$ decreases the domain diameter D and the gradient drive control field $H_1$ develops a force on the magnetic domain 20 to the right. Since the diameter of the magnetic domain is less, the net force during the negative half cycle is less and the magnetic domain 20 is moved from the position $X_1''$ to the position $X_1'''$ a distance indicated by the arrow $X_B$ which is less than the distance from $X_1$. to $X_1''$. Accordingly, the net displacement $X_1'$ to $X_1'''$, indicated by the arrow $X_N$ represents the average product of the input signals of I1 times I2 during one cycle.

FIG. 2B illustrates the condition when there is between 0° and 90° phase difference between the input signals I1 and I2. The domain 20 is driven to a maximum leftward position $X_1''$ which is a shorter distance, indicated by the arrow $X_A$, than the $X_1''$ position in FIG. 2A. The domain 20 is then moved to the right to the position $X_1'''$ through the distance indicated by the arrow $X_B$ providing a net displacement $X_1'$ to $X_1'''$ represented by the arrow $X_N$ corresponding to the average product of the in phase portions of the input signals dependent upon the phase angle between the signals. This net displacement in FIG. 2B corresponds to the real or apparent power and is the watthour measurement. At 90° phase difference the product of the I1 and I2 signals produce equal oscillations of the domain 20 so there is no net displacement corresponding to a zero power factor condition.

In FIG. 2C, propagation of the magnetic domain 20 is shown for 180° phase difference between the input signals I1 and I2. Starting at $X_1'$ the domain moves left to $X_1''$ and then right to $X_1'''$ for the same reasons noted above. This represents negative energy consumption.

Pulses P1 or P2 are generated in response to domain propagation detected after travelling the lengths $X_1$ or $X_2$ by the detectors 40 or 41 from initial time to at times $t1$, $t2$ — $tn$ so the total distance traveled by all the repeated generated domains in a time interval $tn$ is the sum of the equations for $x$ noted above $x$ or $$x_{(total)} = \int_{t0}^{t1} Pdt + \int_{t1}^{t2} Pdt - - - \int_{tn-1}^{tn} Pdt.$$

Accordingly, the total distance $X_{(total)}$ which the domains travel is proportional to the total pulses signal $P_t$ which is the number of the pulses P1 counted by the counter 41 less the pulses P2 counted by the counter 42. Therefore, the count of the pulses developed by the magnetic domains being detected is a measure of the time integral of power supplied through the conductors 38 and 39 or the electrical energy consumed in watthours.

In operation, a first magnetic domain represented by the domain 20 is initiated by the control circuit 27 which produces an input pulse from the source 29 to the domain generator 30. Due to the alternating current nature of the input signals I1 and I2 the magnetic domain 20 will be acted upon in directions both toward both channel ends 17 and 18 with a net displacement representing the measured electrical energy. The time that each domain is propagated is long compared to the period of the cycles occurring in the input signals I1 and I2 and a relative long time or large number of cycles before a magnetic domain reaches one end of the propagating channel 16 to produce a pulse count. The velocity can be reduced by an amount controlled by the damping plate C formed of a conductive layer as shown in FIG. 1A. Eddy current losses produce the reduced velocity and are constant so that a damping factor is to be considered in determining the proportionality of the domain velocity. As a domain is detected and annihilated at the channel end a domain is immediately generated at the generator 30. The net distances of all of the magnetic domains propagated after a long period of time is given by the difference of the pulses P1 and P2 produced by the counter 42 and the counter 43. The differences are established by the output circuit 52 by signal $P_t$ and this difference is, therefore, proportional to the time integral of the product of input signals I1 and I2 and the time integral of the product of the current and voltage power component quantities $I_p$ and $V_p$ of the power P and represent the measured electrical energy in watthours.

It is contemplated that modifications and variations of the preferred embodiment as shown in the single figure of the drawing may be made without departing from the spirit and scope of this invention. For example, alternate magnetic field producing means can replace the conductors 21 and 22 to generate the fields $H_2$ and $H_1$. Also if the input signals I1 and I2 are direct current signals representing quantities to be computed the gradient control field $H_1$ will continuously force the domain 20 toward one of the channel ends. Each pulse initiated by the detectors 40 or 41 will represent the time integral of the product of the input signals as described for the alternating current input signals I1 and I2 described in detail hereinabove plus a term proportional to $D_0$ times I1.

I claim:

1. A magnetic domain computational circuit arrangement for computing the time integral of a product of two quantities, said arrangement comprising:

- a magnetic layer of magnetic domain propagating material having a domain propagating channel defined therein;
- means generating a single wall magnetic domain in said propagating channel;
- first drive control magnetic field producing means establishing a uniform variable field being variable in space and in time in said propagating channel such that the field variations are effective to vary the size of said single wall magnetic domain;
- a first input signal corresponding to one of said quantities for varying said first drive control magnetic field producing means in response to the magnitude of the one quantity;
- a second drive control magnetic field producing means establishing a magnetic field gradient in said propagating channel such that the field gradient is uniform in space between the ends of said propagating channel and is cooperatively acting with the first magnetic field to propagate said magnetic domain in response to the product of the first and second magnetic fields;
- a second input signal corresponding to the other of said two quantities for varying said second drive control magnetic field producing means as a function of time in response to the magnitude of said other quantity;
- magnetic domain detector means located on said propagating channel at a predetermined spaced relationship relative to said magnetic domain generating means so as to be operated by a magnetic domain initiated by said domain generating means and driven to the location of the detector means by the combined driving effects of the first and second magnetic fields such that the time for a magnetic domain to be driven from the domain generating means to the domain detecting means represents the time integral of the product of said first and said second input signals.

2. The magnetic domain computational arrangement as claimed in claim 1, including first means responsive to a current component of an electrical power quantity for developing said first input signal in response to said current component; and further including a second means responsive to a voltage component of the electrical power quantity for developing said second input signal; and further including means responsive to the domain detector being operated by the domain propagation to immediately generate another magnetic domain by the domain generating means, such that the number of detecting operations of the detector means indicates a quantum of measured electrical energy.

3. The magnetic domain computational arrangement as claimed in claim 2, wherein the magnetic domain generating means is located substantially at the center of said magnetic domain propogating channel, and wherein said arrangement includes a second magnetic domain detector means located on the opposite end of the propagating channel from the domain generating means with respect to the other magnetic domain detector means and in a spaced relationship such that both of the magnetic domain detector means are substantially equally spaced from the magnetic generating means; said arrangement further including a damping plate means positioned one side of the propagating channel; said arrangement further including first and second counter means each responsive to operation of a separate one of the magnetic domain detectors; and said arrangement still further including means for combining and accumulating the count of said first and second counting means so as to produce an accumulated count corresponding to a computed energy value of the power quantity.

4. The magnetic domain computational arrangement as claimed in claim 1 wherein said first drive control magnetic field producing means includes a rectangularly shaped conductor loop having opposite side portions equally spaced from opposite sides of the domain propagating channel; and wherein said second drive control magnetic field producing means includes a conductor loop having opposite side portions converging along the opposite sides of the domain propagating channel and extending the length thereof.

* * * * *